United States Patent [19]

Phillips

[11] 3,725,793

[45] Apr. 3, 1973

[54] CLOCK SYNCHRONIZATION ARRANGEMENT EMPLOYING DELAY DEVICES

[75] Inventor: Earl Gordon Phillips, Aurora, Ill.

[73] Assignee: Bell Telephone Laboratories, Incorporated, Murray Hill, Berkeley Heights, N.J.

[22] Filed: Dec. 15, 1971

[21] Appl. No.: 208,319

[52] U.S. Cl. ............328/63, 178/69.5 R, 179/15 BS, 307/208, 307/269, 328/120, 328/179

[51] Int. Cl. ..............................................H03k 1/00

[58] Field of Search ..328/63, 72, 120, 179; 307/208, 307/269; 178/69.5 R, 69.5 DC; 179/15 BS

[56] References Cited

UNITED STATES PATENTS 3,588,709 6/1971 Hoyler..................................328/63

OTHER PUBLICATIONS

"Electronic Design" 12, June 6, 1968, pages 91–93.

*Primary Examiner*—Stanley D. Miller, Jr.
*Attorney*—R. J. Guenther et al.

[57] ABSTRACT

An arrangement for synchronizing the clocks of a plurality of subsystems is disclosed. The arrangement comprises a pulse generator for applying a series of basic clock pulses to local clock circuits in the several subsystems and a circuit which periodically blocks one pulse of the series of basic clock pulses. A detection circuit in each subsystem reinitializes the local clock circuit of the subsystem when the absence of one of the basic clock pulses is detected.

9 Claims, 3 Drawing Figures

CLOCK SYNCHRONIZATION ARRANGEMENT EMPLOYING DELAY DEVICES

BACKGROUND OF THE INVENTION

1. Field of the Invention

The invention relates to an arrangement for synchronizing a plurality of clock circuits and more specifically relates to an arrangement for synchronizing the clocks of a plurality of subsystems of a data processing system which are driven from a common pulse source.

2. Description of the Prior Art

In high speed data processing systems, the synchronization of the clocks of the various subsystems becomes increasingly important for communications between the various subsystems. It is well known that clock signals from a single clock pulse source may be used for the generation of timing pulses in more than one subsystem by simultaneously transmitting the clock signals to the various subsystems. It is further known that errors may be introduced in the transmission of the clock signals due to the presence of extraneous noise pulses. To prevent such errors from continuously propagating in the timing pulses generated by a subsystem, a synchronization signal may be sent periodically to simultaneously reinitialize the timing circuits of the various subsystems. In one prior art system, one processor is synchronized with another by using one clock pulse source to supply the basic clock pulses for the generation of timing pulses in both processors, and by transmitting a synchronizing pulse once in every clock cycle period from one of the processors to the other processor on a separate cable. However, to assure the desired phase relationship between the basic clock pulses and the synchronization pulses, the two cables used for the transmission of the clock pulses and the synchronization pulses have to be matched at the time of system installation. Such an arrangement using separate cables for transmitting synchronization signals is cumbersome and expensive when a plurality of subsystems are to be synchronized.

SUMMARY OF THE INVENTION

In accordance with my invention, the timing circuits of several subsystems are driven from a single clock pulse generator and all the timing circuits are synchronized by a synchronization signal which is periodically encoded into the string of basic clock pulses produced by the clock pulse generator. In one illustrative embodiment of my invention, the clock pulse generator is used to generate a square wave from which each of the timing circuits derives timing pulses to be used locally in each of the subsystems. Periodically one pulse of the square wave is omitted. A detection circuit in each of the subsystems detects the absence of a pulse in the string of square wave pulses and reinitializes the associated timing circuit. In this manner, the clock circuits of all of the subsystems are reinitialized simultaneously and all of the subsystems begin a new clock cycle at the same point in time.

DESCRiPtION

Figure 1:
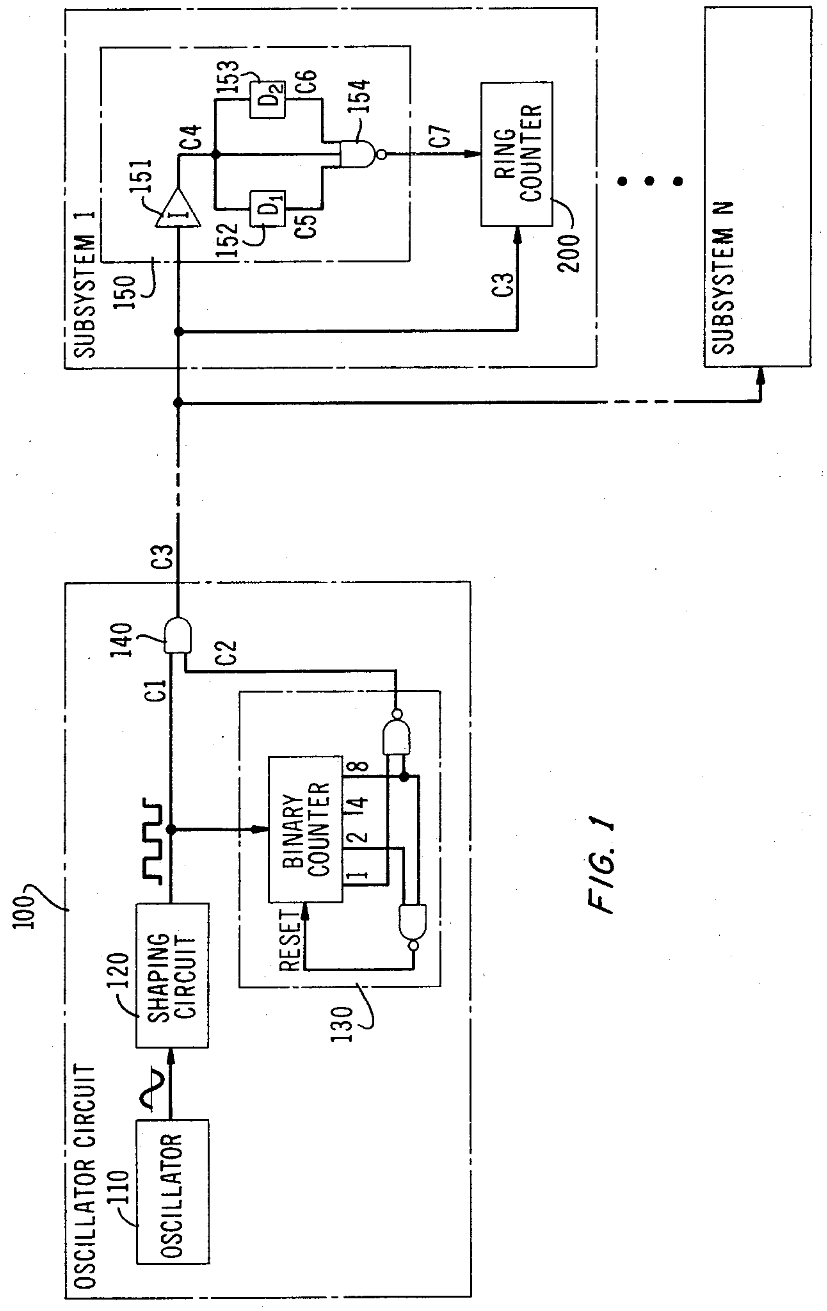
FIG. 1 represents one illustrative embodiment of my invention.
Figure 3:
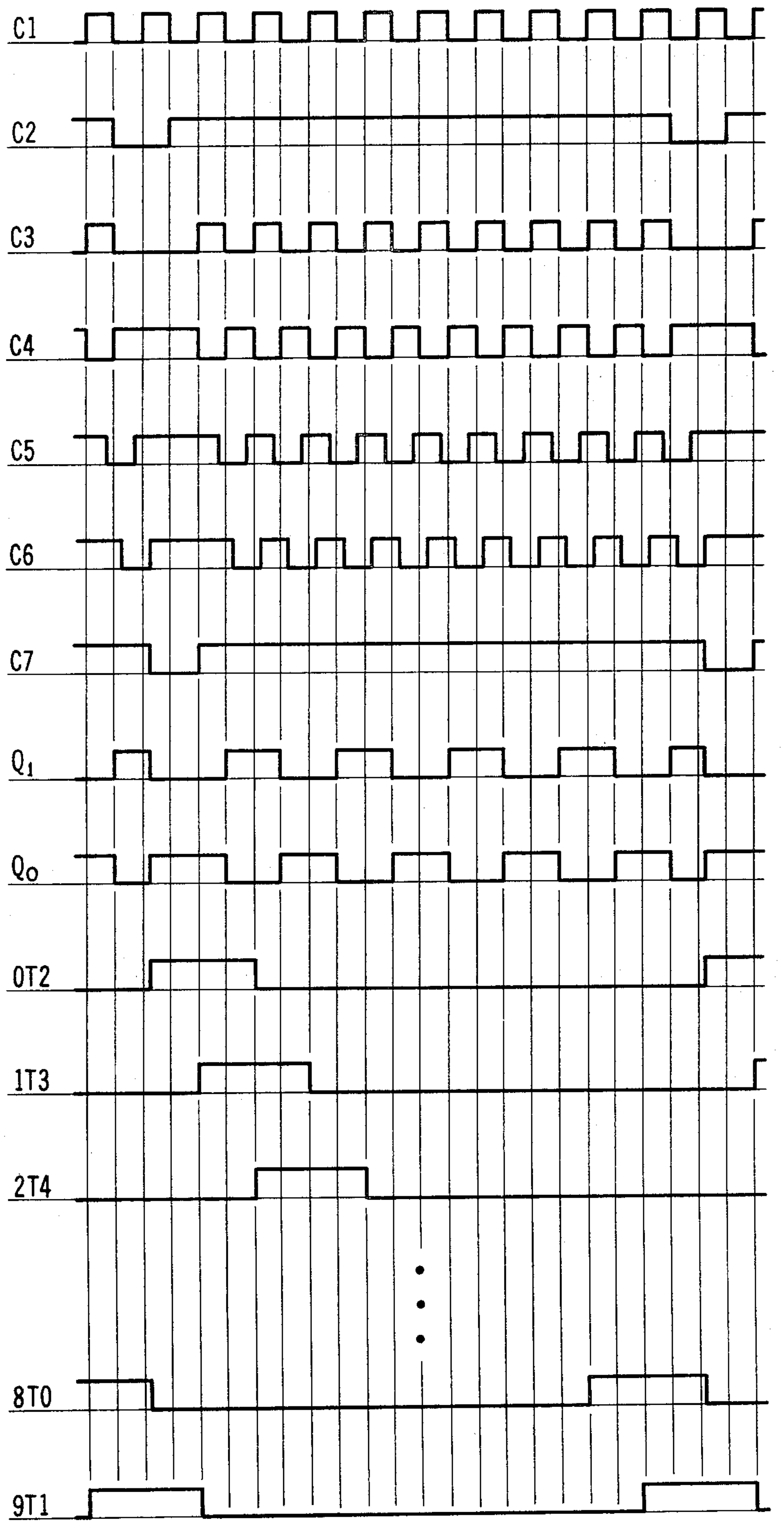
FIG. 3 is a timing diagram showing the relative position in time of various signals produced by the circuits of FIG. 1 and FIG. 2.

The oscillator circuit 100 shown in FIG. 1 contains an oscillator 110, which may be of any known type which generates a high frequency sine wave; for example, a sine wave having a 50 nanosecond cycle period. The sine wave is fed to a known shaping circuit 120 which is responsive to the sine wave to generate a square wave having the same cycle period as the sine wave. The square wave is applied to a counter circuit 130 and AND gate 140. The counter circuit is a known circuit which is prearranged to count to a predetermined number and to produce an inhibit pulse when that number is reached. The inhibit pulse is applied to AND gate 140 by means of conductor C2 and for a sufficiently long period of time to prevent one square wave pulse from being gated through the AND gate. The counter clearly may be set to any desired count. In the disclosed illustrative system, the cycle time of the clocks of the subsystems is 500 nanoseconds, and the counter 130 is designed to generate an inhibit signal on conductor C2 during the occurrence of every tenth pulse of the square wave on conductor C1. The counter is responsive to the trailing edge of the pulses on conductor C1 and the inhibit pulse begins after the ninth pulse and ends after the tenth pulse. FIG. 3 shows the waveforms occurring on conductors C1 and C2, the inputs to AND gate 140, and the resulting waveform on conductor C3 at the output of AND gate 140. As can be seen from FIG. 3, the waveform occurring on conductor C3 has a string of nine consecutive pulses followed by a period in which no pulse occurs.

The oscillator circuit 100 may be employed to drive the clock circuits of a plurality of subsystems as is indicated in FIG. 1. Each of the subsystems has a synchronization signal detection circuit 150 and a ring counter 200. FIG. 1 shows that the conductor C3 interconnects the output of AND gate 140 with the detection circuit 150 and the ring counter 200. The detection circuit comprises the combination of the inverter 151, the delay circuits 152 and 153, and NAND gate 154. The absence of a pulse in the string of pulses occurring on conductor C3 causes this detection circuit to apply a reinitialization signal to the ring counter 200 via conductor C7. Referring again to FIG. 3, it can be seen that the waveform occurring on conductor C4 at the output of the inverter 151 is the exact inverse of the waveform occurring on conductor C3. The delay circuits 152 and 153 are known delay elements and have slightly different delay characteristics. The first has a delay slightly less than 180° and the second one has a delay slightly greater than 180°. Each of the conductors C4, C5, and C6 are applied to the inputs of NAND gate 154 which produces an output signal of a certain positive voltage level, except when all three inputs are positive in which case it produces an output signal of a near zero level. The waveforms occurring on C4, C5, and C6 are shown in FIG. 3. The waveforms of FIG. 3 are, of course, only an illustrative representation of the waveforms occurring on the indicated conductors and the amount of delay less than 180° and greater than 180° introduced on conductors C5 and C6, respectively, is greatly exaggerated for the purpose of illustration. Comparing the waveforms on conductors C4, C5, and C6 as represented in FIG. 3, it will be seen that there is no time in which all three simultaneously have a positive signal except during the time period that a pulse was blocked in the chain of pulses originally occurring on conductor C3. The two independent delay circuits 152 and 153 are employed to assure that no erroneous pulses are generated by NAND gate 154 if the duty cycle of the original square wave should vary slightly due to error introduced in the transmission to the subsystems.

Figure 2:
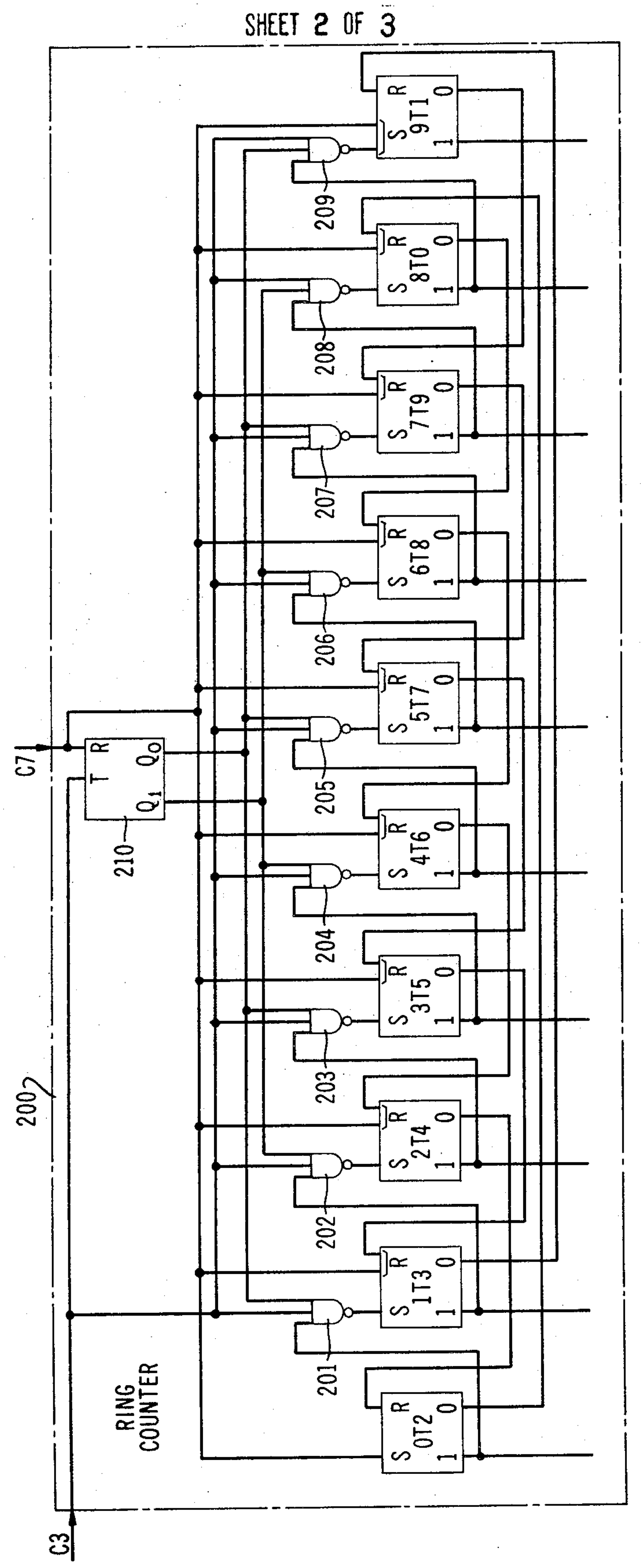
FIG. 2 shows in greater detail a ring counter which may be used to produce the clock timing pulses in the various subsystems of FIG. 1.

FIG. 2 shows the ring counter 200 which comprises 10 timing pulse flip-flops, labeled 0T2 through 9T1, which produce a series of 10 overlapping timing pulses, and a toggle flip-flop 210 which changes state at the trailing edge of each positive pulse applied to the toggle input thereof. Each of the timing pulse flip-flops 0T2 through 9T1 has an input from conductor C7 from the detector circuit 150 discussed above. When the subsystems are first initialized, the ring counter may be in any random state and an initialization pulse on conductor C7 causes the 0T2 and 9T1 flip-flops to be set and causes all of the other flip-flops of the ring counter, as well as the toggle flip-flop 210, to be reset. The pulses occurring on conductor C3 control the setting of timing flip-flops 1T3 through 9T1. The timing pulse flip-flops are interconnected in such a manner that those other than the 0T2 flip-flop will not be set unless the immediately preceding flip-flop has been set. The outputs Q0 and Q1 of the toggle flip-flop 210 are used in the setting of the timing flip-flops 1T3 through 9T1 to assure that only one flip-flop is set with each pulse occurring on conductor C3. Output Q0 will be high after the toggle flip-flop is reset by the initialization signal on conductor C7. Thus, the first clock pulse occurring on conductor C3 after the 0T2 flip-flop has been set will cause timing flip-flop 1T3 to be set since all three inputs of NAND gate 201, which is connected to its set input, are then in the positive state. At the end of the pulse on conductor C3, which causes the 1T3 flip-flop to be set, the flip-flop 210 will be toggled, causing output Q1 to be high and Q0 to be low. During the next positive pulse on conductor C3, flip-flop 2T4 will be set since all inputs to NAND gate 202 (i.e., C3, Q1, and 1T3) are high. As flip-flop 2T4 is set, its "0" output assumes a near "0" voltage level which causes this signal to be applied to the reset terminal of the 0T2 flip-flop, thereby resetting the latter. In similar manner, the other timing flip-flops are set and reset in succession. FIG. 3 shows the time relationship between the overlapping timing pulse signals generated by the timing flip-flops 0T2 through 9T1 and the states of output terminals Q0 and Q1 of the toggle flip-flop 210. After a series of nine pulses have occurred on conductor C3, flip-flops 8T0 and 9T1 will be set. Thereafter, a pulse will be blanked out on conductor C3 and a negative pulse will occur on conductor C7. The negative pulse on conductor C7 causes the 8T0 flip-flop to be reset and causes the 0T2 flip-flop to be set, thereby initiating a new clock cycle.

It is to be understood that the above-described arrangement is merely illustrative of the application of the principles of the invention; numerous other arrangements may be devised by those skilled in the art without departing from the spirit and scope of the invention.

What is claimed is:

1. In a data processing system comprising a plurality of subsystems:
   means for generating a first serial stream of repetitive pulses;
   means for altering said first stream of pulses by periodically deleting certain of said pulses;
   means for transmitting the altered first stream of pulses to said subsystems;
   clock means in each of said subsystems responsive to said pulses in said altered first stream to generate clock timing signals;
   means associated with each of said clock means for reinitializing the associated clock means, comprising:
   means for generating a second stream of pulses representing the logical inversion of said altered first stream of pulses;
   means for delaying the pulses of said second stream; and
   means for logically combining said second stream of pulses and the delayed pulses to generate signals for reinitializing the associated clock means.

2. A system in accordance with claim 1, wherein said means for delaying said pulses of said second stream comprises a first delay circuit, responsive to said second stream of pulses, having a delay characteristic sufficient to phase delay said pulses by an amount approximating, but less than, 180°.

3. A timing arrangement for synchronizing a plurality of subsystems of a data handling system comprising:
   means for generating a stream of repetitive pulses;
   counter means for repetitively generating an inhibit signal after a predetermined number of pulses of said stream have been generated;
   means for logically combining said inhibit signal and said stream of pulses to produce timing signals;
   clock means in each of said subsystems responsive to said timing signals to produce clock signals;
   synchronization means associated with each of said clock means for producing clock synchronization signals, comprising:
   means for logically inverting said timing signals;
   means for delaying the inverted timing signals; and
   means for logically combining said inverted timing signals and the delayed, inverted timing signals to produce clock synchronization signals.

4. The system of claim 2 wherein said means for delaying said pulses of said second stream further comprises a second delay circuit, responsive to said second stream of pulses, having a delay characteristic sufficient to phase delay said pulses by an amount approximating, but greater than, 180°.

5. An arrangement in accordance with claim 3, wherein said means for delaying the inverted timing signals comprises:
   a first delay circuit for delaying said inverted signals by an amount approximating, but less than, 180° with respect to the fundamental frequency at which said repetitive pulses are produced; and a second delay circuit for delaying said inverted signals by an amount approximating, but greater than, said 180°.

6. A reinitialization arrangement, responsive to an input stream of pulses characterized by the periodic absence of selected pulses, comprising:

means for inverting the pulses in said input stream of pulses;

means for delaying the inverted pulses of said input stream; and means for logically combining the delayed pulses and said inverted pulses for producing reinitialization signals.

7. In combination:

an inverter comprising an input terminal and an output terminal;

a first delay circuit having a first delay characteristic and comprising an output terminal, and an input terminal connected to said output terminal of said inverter;

a second delay circuit having a second delay characteristic and comprising an output terminal, and an input terminal connected to said output terminal of said inverter; and a logic circuit comprising an output terminal, an input terminal connected to said output terminal of said inverter, an input terminal connected to said output terminal of said first delay circuit, and an input terminal connected to said output terminal of said second delay circuit.

8. The combination of claim 7 further comprising a counter comprising an input terminal responsive to signals for advancing the count of said counter connected to said input terminal of said inverter and an input terminal responsive to signals for setting the state of said counter connected to said output terminal of said logic circuit.

9. In a data processing system, the combination comprising:

means for generating at an output terminal a serial stream of pulses at a selected fundamental frequency, said stream of pulses characterized by the periodic absence of one pulse;

an inverter comprising an output terminal, and an input terminal connected to said output terminal of said means for generating a stream of pulses;

a plurality of delay circuits each having a unique delay characteristic and each comprising an output terminal, and an input terminal connected to said output terminal of said inverter;

a logic circuit comprising an output terminal, and an input terminal connected to said output terminal of said inverter, and a plurality of input terminals each connected to the output terminal of one of said plurality of delay circuits; and a counter comprising an input terminal responsive to signals for advancing the count of said counter connected to said input terminal of said inverter and a reset input terminal connected to said output terminal of said logic circuit.

* * * * *